United States Patent [19]

Olson et al.

[11] Patent Number: 5,043,418

[45] Date of Patent: Aug. 27, 1991

[54] METHOD FOR STABILIZING POLYAMIDE ACID SOLUTIONS OF PYROMELLITIC DIANHYDRIDE AND COATING COMPOSITIONS

[75] Inventors: Daniel R. Olson, Schenectady; Elbridge, A. O'Neil, Port Henry, both of N.Y.

[73] Assignee: General Electric Company, Schenectady, N.Y.

[21] Appl. No.: 253,022

[22] Filed: Oct. 4, 1988

[51] Int. Cl.[5] .................. C08G 8/02; C08G 69/26; C08G 69/42; C08G 73/10

[52] U.S. Cl. .................. 528/353; 528/125; 528/126; 528/128; 528/172; 528/185; 528/352

[58] Field of Search ............ 528/353, 125, 352, 126, 528/128, 172, 185

[56] References Cited

U.S. PATENT DOCUMENTS

| | | | |
|---|---|---|---|
| 3,496,132 | 2/1970 | Boldebuck et al. | 524/726 |
| 3,767,550 | 10/1973 | Boldebuck | 204/181.6 |
| 3,810,858 | 5/1974 | Boldebuck | 521/49.8 |
| 4,603,195 | 7/1986 | Babich et al. | 528/43 |
| 4,634,755 | 1/1987 | Hallgren et al. | 528/37 |
| 4,672,099 | 6/1987 | Kunimune et al. | 528/26 |
| 4,719,125 | 1/1988 | Anello et al. | 528/37 |
| 4,810,728 | 3/1989 | Gross et al. | 528/32 |

OTHER PUBLICATIONS

CA 101(2):7828p "Polyamic Acid Derivatives and Polyimide", N. V. Philips' Gloeilampenfabrieken, Chemical Abst. vol. 101, 1984.
CA 81(20):121414u "Polyimides", Davidovich et al. Chemical Abs. 81, 1974.
Rochow *Chemistry of the Silicones*, Second Edition, John Wiley & Sons, New York, 1951, p. 186.

*Primary Examiner*—Morton Foelak
*Assistant Examiner*—P. Hampton-Hightower
*Attorney, Agent, or Firm*—William A. Teoli; James C. Davis, Jr.; William H. Pittman

[57] ABSTRACT

A method is provided for stabilizing polyamide acids of pyromellitic dianhydride and pyromellitic dianhydride copolymers utilizing certain silicon nitrogen compounds such as hexamethyldisilazane.

8 Claims, No Drawings

METHOD FOR STABILIZING POLYAMIDE ACID SOLUTIONS OF PYROMELLITIC DIANHYDRIDE AND COATING COMPOSITIONS

BACKGROUND OF THE INVENTION

The present invention relates to pyromellitic dianhydride polyamide acid coating compositions having improved shelf stability and method for making. More particularly, the present invention relates to the use of an organic silazane, such as hexamethyldisilazane, as a stabilizer for polyamide acid solutions of pyromellitic dianhydride.

Prior to the present invention, pyromellitic dianhydride (PMDA) was commonly used in the manufacture of polyamide acids in the form of a substantially anhydrous solution of the polyamide acid in dipolar aprotic solvent, such as N-methylpyrolidone. It is generally known, however, that polyamide acid solutions derived from PMDA suffer from unsatisfactory storage stability, as shown by T. Inaike et al., U.S. Pat. No. 4,535,105. In some instances, refrigeration has been found useful for improving the shelf stability of polyamide acids, where the polyamide acid was in the form of an aqueous dispersion useful for electrodeposition, as shown by Boldebuck, U.S. Pat. No. 3,767,550. In particular instances, ammonium salts of saturated monocarboxylic acids, or ammonium salts of aromatic monocarboxylic acids have been used during the formation of the polyamide acid to control the viscosity of the polyamide acid, such as shown by Boldebuck et al., U.S. Pat. No. 3,496,132. Bases, such as alkali metal hydroxides, organic bases such as guanidine or watersoluble organic amines such as pyridine, morpholine, triethylamine and ammonium salts also have been used to partially neutralize aqueous polyamide acid dispersions.

It would be desirable to make substantially anhydrous polyamide acid solutions which are convertible to polyimide films or as polyimide binders for making composites where the polyamide acid solutions can be stored over an extended period of time such as 30 days or more and thereafter converted to useful polyimide films or composite binders.

The present invention is based on the discovery that organic silazane, such as hexamethyldisilazane, can be incorporated into a solution of a pyromellitic dianhydride polyamide solution, to produce a polyamide acid solution having substantially improved shelf stability. It has been further found that polyamide acids in the form of copolymers of PMDA units, and units resulting from the condensation of bisphenol A dianhydride, as defined hereinafter, with appropriate aryldiamines also can be stabilized with effective amounts of the organic silazane.

STATEMENT OF THE INVENTION

There is provided by the present invention, a polyimide precursor comprising a substantially anhydrous solution of a pyromellitic anhydride polyamide acid having a stabilizing amount of an organic silicon-nitrogen material selected from the class consisting of silazanes and silylamines.

Organic silicon-nitrogen material which can be used in the practice of the present invention as stabilizers are silicon-nitrogen compounds having at least one chemically combined structural unit of the formula, $$[(R)_a Si]_c N - (R^1)_b,$$

where R is a $C_{(1-13)}$ monovalent hydrocarbon radical or a $C_{(1-13)}$ monovalent hydrocarbon radical substituted with monovalent radicals inert during addition or condensation reactions, $R^1$ is a monovalent radical selected from hydrogen and $C_{(1-8)}$ monovalent hydrocarbon radical, a is equal to 2 or 3, b is equal to 0 to 2 and c is equal to 1 to 3, and when a is 2, c is 1 and b is 1, it can be a repeat unit. Some of the silazanes included by the formula are shown by . Rochow Chemistry of the Silicones, Second Edition, John Wiley & Sons, New York, 1951, pg. 186. The preferred silicon compound is hexamethyldisilazane (HMDZ). However, other silicon-nitrogen compounds, such as silylamines, for example, trimethylsilyldimethylamine, also can be used.

In addition to pyromellitic dianhydride (PMDA), there can be used mixtures of PMDA and 2,2-bis[-(3,4-dicarboxyphenoxy)phenyl dianhydride (BPADA). There can be present in the mixtures from about 0.1 to 2 moles of PMDA, per mole of BPADA.

In preparing the polyamide acid, the aromatic dianhydride is condensed with aromatic diamine, which can include, for example, m-phenylenediamine; p-phenylenediamine; 4,4'-diaminodiphenylpropane; 4,4'-diaminiodiphenylmethane; benzidine; 4,4'-diaminodiphenyl sulfide; 4,4'-diaminodiphenyl sulfone; 4,4'-diaminodiphenyl ether; 1,5-aminonaphthalene; 3,3'-dimethylbenzidine; 3,3'-dimethoxybenzidine; 2,4-diaminotoluene; 2,6-diaminotoluene; 2,4-bis-(β-amino-t-butyl)toluene; bis(p-β-methyl-o-aminopentyl)benzene; 1,3-diamino-4-isopropylbenzene; 1,2-bis(3-aminopropoxy)ethane; m-xylylenediamine; p-xylylenediamine; bis(4-aminocyclohexyl)methane; decamethylenediamine; 3-methylheptamethylenediamine; 4,4-dimethylheptamethylenediamine; 2,11-dodecanediamine; 2,2-dimethylpropylenediamine; octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1,4-cyclohexanediamine; 1,12-octadecanediamine; bis(3-aminopropyl)sulfide; N-methyl-bis(3-aminopropyl)amine; hexamethylenediamine; heptamethylenediamine; 2,4-diaminotoluene; nonamethylenediamine; 2,6-diaminotoluene; bis-(3-aminopropyl)tetramethyldisiloxane, etc. Preferably the aromatic diamines are paraphenylenediamine, metaphenylenediamine and 4,4'-diaminodiphenyl ether.

In instances where p-phenylene diamine (PPD) is used, it is preferred to use PPD as part of a mixture of aromatic diamine unless there is used a mixture of PMDA and BPADA in the condensation mixture.

In the practice of the instant invention, substantially equimolar amounts of the aromatic dianhydride, which hereinafter means pyromellitic dianhydride (PMDA), or a mixture of PMDA and BPADA is condensed with aromatic diamine, as previously defined, in the presence of a dipolar aprotic solvent under substantially anhydrous conditions. A temperature in the range of from 20° C. to 80° C. can be employed along with agitation of the resulting mixture. Upon forming the polyamide acid which can occur in about 0.5 to 10 hours, there can be incorporated an effective amount of the silicon-nitrogen material as previously defined. An effective amount of silicon-nitrogen material is found to be from about 0.5% to 5% by weight of silicon-nitrogen material based on the total weight of the polyamide acid solids. Polyamide acid solids can vary from 10% to 50% weight of total solution.

In order that those skilled in the art will be better able to practice the present invention, the following examples are given by way of illustration and not by way of limitation. All parts are by weight unless otherwise indicated.

Example 1

Polyamide acid solution was prepared containing 25% solids, by intercondensing 35 mole percent of BPADA, 15 mole percent of PMDA with 50 mole percent of paraphenylenediamine (PPD) and N-methylpyrolidone (NMP). After stirring for 1 hour under ambient conditions, viscosity of the resulting solution was found to be 268 stokes. A polyimide film was prepared from the polyamide acid by coating the solution onto a glass substrate to a thickness of 2 mil and heating it to a temperature of 330° C. for 60 minutes. There was obtained a polyimide film which was hard, tough and resistant to breaking upon bending. After 6 days at room temperature under substantially anhydrous conditions, the viscosity of the polyamide acid solution had dropped to 12.9 stokes. Only poor quality film could be obtained from the polyamide acid having reduced viscosity as shown by the fact that it could not be bent without breaking and crumbling.

The above procedure was repeated except that 1% by weight of hexamethyldisilazane, based on the weight of the solids, was added to the solution. After stirring for 1 hour, the solution viscosity of 268 stokes and a good quality polyimide film was obtained from it. The viscosity of the solution dropped to 20 stokes in 29 days while the solution remained under sealed conditions at ambient temperatures. Another good quality film was obtained from this solution. Longer shelf periods also showed that the hexamethyldisilazane was an effective stabilizer. High levels of hexamethylsilazane provided longer shelf lives as shown in the following table.

25% solids solution in NMP. After stirring 1 hour at room temperature, a polyimide film was prepared in accordance with Example 1 and was found to be tough. After the same solution had been allowed to age at room temperature and under sealed conditions for 14 days, the polyimide film prepared from the resulting solution cracked and had no mechanical integrity. A polyamide acid solution was prepared following the same procedure except that 2% by weight based on the weight of reactants of HMDZ was added to the solution. There was obtained tough polyimide films from the solution after stirring at room temperature for 1 hour and after standing at room temperature for 24 days under sealed conditions.

Example 3

A mixture of 15.6 parts of BPADA, 2.8 parts of PMDA, 4.3 parts of 4,4'-oxydianiline, 2.3 parts of paraphenylenediamine and 75 parts of NMP was stirred under ambient conditions in the substantial absence of moisture for about 1 hour. After aging for 1 day, a polyimide film was prepared in accordance with the method of Example 1 and found to be tough and hard and resistant to breaking upon bending. After 14 days of solution aging under ambient conditions in the substantial absence of moisture, a film prepared by the procedure of Example 1 was found to readily crack and break when an attempt was made to bend it.

The same procedure was repeated except that 0.116 part of HMDZ was added to 23 parts of a polyamide acid solution. The resulting mixture was stirred and then allowed to age under substantially anhydrous conditions under ambient conditions. A good quality film was obtained after the solution had aged for 24 days.

A polyamide acid was made in accordance with the procedure of Example 1, except that 5.02 parts of polyphenylenediamine were replaced with 5.02 parts of POLYAMIDE ACID SOLUTION VISCOSITY AND POLYIMIDE FILM QUALITY WITH AND WITHOUT HMDZ

| DAY | 0% HMDZ (CONTROL) | | 1% HMDZ | | 2% HMDZ | | 3% HMDZ | |
|---|---|---|---|---|---|---|---|---|
| | VISCOSITY[A] | FILM | VISCOSITY[A] | FILM | VISCOSITY[A] | FILM | VISCOSITY[A] | FILM |
| 1 | 268 | Good | 268 | Good | 268 | Good | 268 | Good |
| 6 | 12.9 | Poor | 27 | Good | 27 | Good | 27 | Good |
| 9 | 8.8 | Poor | 23 | Good | 23 | Good | 23 | Good |
| 12 | 7.5 | Poor | 23 | Good | 23 | Good | 23 | Good |
| 15 | 6.3 | Poor | 23 | Good | 23 | Good | 23 | Good |
| 22 | 6.3 | Poor | 23 | Good | 23 | Good | 23 | Good |
| 29 | 6.3 | Poor | 20 | Good | 23 | Good | 23 | Good |
| 36 | 6.3 | Poor | 20 | Good | 23 | Good | 23 | Good |
| 43 | 6.3 | Poor | 20 | Good | 20 | Good | 23 | Good |
| 50 | 6.3 | Poor | 20 | Good | 20 | Good | 23 | Good |
| 70 | 6.3 | Poor | 17.6 | Good | 20 | Good | 23 | Good |
| 92 | 6.3 | Poor | 15 | Good | 17.6 | Good | 23 | Good |
| 114 | 6.3 | Poor | 12.9 | Poor | 17.6 | Good | 20 | Good |

A. Viscosity of Polyamide Acid Measured in Stokes

The above results show that the hexamethyldisilazane is an effective stabilizer for polyamide acids. In addition, higher levels of hexamethyldisilazane provide greater stability over extended shelf periods. In the above table, a film was considered good or "tough" if a 2"×1"×0.001" film could be bent until contact between ends were achieved without breaking.

Example 2

A polyamide acid solution was made by condensing 32.5 mole percent of BPADA, 17.5 mole percent of PMDA, 25 mole percent of 4,4'-oxydianiline and 25 mole percent of paraphenylenediamine to provide a metaphenylenediamine. A good quality film was obtained from the resulting polyamide acid following the procedure of Example 1 after the solution had aged for 52 days.

Although the above examples are directed to only a few of the very many variables which can be used in the practice in the method of the present invention and the compositions made therefrom, it should be understood that the present invention is directed to the use of a much broader variety of aromatic dianhydride mixtures, organic diamines, and dipolar aprotic solvents, which are employed in the preparation of the polyamide acid. In addition, the present invention is directed to the use of a much broader variety of silicon-nitrogen compounds which are shown by the formula, as well as the ingredients preceding these examples.

What is claimed is:

1. A polyimide precursor comprising a substantially anhydrous solution of the polyamide acid reaction product of pyromellitic anhydride and an aromatic diamine and a stabilizing amount of a silazane.

2. A polyimide precursor in accordance with claim 1, where the pyromellitic anhydride polyamide acid is dissolved in N-methylpyrolidone.

3. A polyimide precursor in accordance with claim 1, where the pyromellitic anhydride polyamide acid is a copolymer of pyromellitic anhydride units, bisphenol A dianhydride units and paraphenylenediamine units.

4. A polyimide precursor in accordance with claim 1, where the silazane is hexamethyldisilazane.

5. A method for making a polyimide precursor, comprising incorporating a stabilizing amount of an organic silicon-nitrogen material selected from the class consisting of silazanes and silyamines to a polyimide precursor comprising a substantially anhydrous solution of a polyamide acid reaction product of pyromellitic anhydride and an aromatic diamine.

6. A method in accordance with claim 5, where the polyamide acid reaction product is dissolved in N-methylpyrrolidone.

7. A method in accordance with claim 5, wherein the pyromellitic anhydride polyamide acid reaction product is a copolymer of pyromellitic anhydride units, bisphenol A dianhydride units and paraphenylene diamine units.

8. A method in accordance with claim 5, where hexamethyldisilazane is utilized as the organic silicon-nitrogen material.

* * * * *